United States Patent
Bossecker (10) Patent No.: US 12,552,442 B2
(45) Date of Patent: Feb. 17, 2026

(54) STEERING GEAR

(71) Applicant: Schaeffler Technologies AG & Co. KG, Herzogenaurach (DE)

(72) Inventor: Maximilian Bossecker, Hügelsheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/969,448

(22) Filed: Dec. 5, 2024

(65) Prior Publication Data

US 2025/0187649 A1 Jun. 12, 2025

(30) Foreign Application Priority Data

Dec. 6, 2023 (DE) .............. 10 2023 134 170.7

(51) Int. Cl.
| | |
|---|---|
| *B62D 3/02* | (2006.01) |
| *B62D 5/04* | (2006.01) |
| *F16H 25/20* | (2006.01) |
| *F16H 25/24* | (2006.01) |

(52) U.S. Cl.
CPC ...................... *B62D 3/02* (2013.01)

(58) Field of Classification Search
CPC ......... B62D 3/02; B62D 5/0445; F16H 25/20; F16H 25/24; F16H 25/2454; F16H 2025/204
USPC .................................. 74/498, 499
See application file for complete search history.

(56) References Cited

U.S. PATENT DOCUMENTS

| | | | |
|---|---|---|---|
| 11,554,806 B2 | 1/2023 | Terashima | |
| 11,840,291 B2 * | 12/2023 | Kim | F16H 25/2214 |
| 12,091,076 B2 * | 9/2024 | Huber | B62D 1/181 |
| 2012/0186987 A1 * | 7/2012 | Mirsky | G01N 27/126 |
| | | | 205/334 |
| 2020/0180677 A1 * | 6/2020 | Hafermalz | B62D 3/12 |

(Continued)

FOREIGN PATENT DOCUMENTS

| | | | | |
|---|---|---|---|---|
| CN | 109591881 A | * | 4/2019 | .......... B62D 5/0421 |
| DE | 102008040235 A1 | * | 1/2010 | ............. F16C 23/08 |
| DE | 102018130228 B3 | | 2/2020 | |

(Continued)

OTHER PUBLICATIONS

Description Translation for DE 102021103018 from Espacenet (Year: 2021).*

*Primary Examiner* — Jason D Shanske
*Assistant Examiner* — Daniel M. Keck (57) ABSTRACT

The disclosure relates to a steering gear for a motor vehicle including a linearly displaceable steering shaft arranged in a non-rotatable manner and mounted on a first bearing point, and a second bearing point spaced apart in a longitudinal extension of the steering shaft. The steering shaft is in engagement with a rotatable gear element so that a rotation of the gear element affects a linear displacement of the steering shaft. A bearing block is fixed to the steering shaft between the first bearing point and the second bearing point, which extends radially outwards from a lateral surface of the steering shaft and engages in a guide element that is stationary relative to the steering shaft. A first sliding element bears against a first sliding surface of the guide element and a second sliding element bears against a second sliding surface of the guide element opposite the first sliding surface.

19 Claims, 9 Drawing Sheets

(56) References Cited

U.S. PATENT DOCUMENTS

2021/0394818 A1    12/2021  Zinnecker et al.
2023/0111260 A1 *  4/2023  Piantoni .................. F16H 19/04
                                                        74/422

FOREIGN PATENT DOCUMENTS

| | | | |
|---|---|---|---|
| DE | 102018123424 A1 * | 3/2020 | ........... B62D 5/0448 |
| DE | 102018125973 A1 * | 4/2020 | ......... F16H 25/2204 |
| DE | 102020105195 A1 | 9/2021 | |
| DE | 102021103018 A1 | 8/2022 | |
| DE | 102021201267 A1 | 8/2022 | |
| EP | 3581465 A2 | 12/2019 | |
| EP | 3699061 B1 | 12/2022 | |
| EP | 3856613 B1 | 4/2023 | |
| WO | WO-2004111496 A1 * | 12/2004 | ................ B60S 1/18 |
| WO | WO-2011009810 A1 * | 1/2011 | ............... B62D 3/02 |

* cited by examiner

STEERING GEAR

CROSS-REFERENCE TO RELATED APPLICATIONS

This application claims priority under 35 U.S.C. Section 119 of German Patent Application No. DE 10 2023 134 170.7 filed Dec. 6, 2023, the disclosure of which is incorporated herein by reference.

TECHNICAL FIELD

The present disclosure relates to a steering gear for a motor vehicle.

BACKGROUND

The present disclosure relates to a steering gear for vehicles, in particular to an improved steering gear which makes the transmission of steering forces more efficient and safer. A steering gear is an essential component of the steering system in vehicles. It converts the rotary movement of the steering wheel into a linear movement, which then steers the wheels. In a steer-by-wire steering system, there is no mechanical connection between the steering wheel and the steering gear, as the steering commands are transmitted from the steering wheel to a road wheel actuator via an electrical signal path. In this regard, the steering gear is then driven by a correspondingly actuated electric adjustment actuator.

In conventional steering gears, the actuation of the steering rod is driven by a gear, which often exerts an additional torque on the shaft. This torque must in turn be supported against the gear housing, which poses various challenges depending on the design of the steering gear. One such challenge is that the tie rods are usually at an angle to the axis of the steering rod, which can lead to deflections of the steering rod, in particular when steering forces and shocks introduced by the road come into effect.

SUMMARY

It is therefore the object of the disclosure to avoid or at least mitigate these problems and to provide an improved steering gear for motor vehicles.

This object is achieved by a steering gear for a motor vehicle, comprising a steering shaft that is arranged in a non-rotatable manner and linearly displaceable and is mounted on a first bearing point and a second bearing point spaced apart in the longitudinal extension of the steering shaft. The steering shaft is in engagement with a rotatable gear element in such a way that a rotation of the gear element affects a linear displacement of the steering shaft. A bearing block is fixed to the steering shaft between the first bearing point and the second bearing point, which extends radially outwards from the lateral surface of the steering shaft and engages in a guide element that is stationary relative to the steering shaft. Between the bearing block and the guide element a first sliding element bears against a first sliding surface of the guide element and a second sliding element bears against a second sliding surface of the guide element opposite the first sliding surface.

The steering gear according to the disclosure achieves an optimized torque support, which is provided between the two main bearing points of the shaft or steering rod. This design ensures an improved transmission and distribution of forces within the steering gear, thereby increasing the safety and efficiency of the steering process in vehicles.

In this context, the steering gear does not hinder the steering shaft in its deflection and can be adjusted with regard to the extents and angles of deflection such that the steering gear is not overconstrained with regard to its bearing.

In its simplest form, the torque support point of the steering gear can have a sliding guide consisting of the bearing block serving as a slide and the guide element having a groove in which the bearing block engages. Here, the two opposing sliding elements also in particular allow for a uniform torque support in both linear displacement directions of the steering shaft.

The bearing block can be attached to the steering shaft by means of a screw connection, for example. In principle, other types of attachment are also conceivable, such as materially bonded connections, in particular welding or adhesive bonding.

A sliding element can, for example, be formed from a material from the group of metals, polymer composites, fluoropolymers, in particular PTFE, ceramics and/or elastomers. Self-lubricating metals or plastics impregnated with solid lubricants such as graphite or molybdenum disulfide can be utilized in order to ensure continuous lubrication.

According to an example embodiment of the disclosure, the first sliding element can be spring-loaded in the direction of the first sliding surface by means of a first spring element and/or the second sliding element can be spring-loaded in the direction of the second sliding surface by means of a second spring element.

An additional spring element, which presses one of the sliding elements against the sliding surface of the guide element with a preload, helps to ensure that the torque support is formed as backlash-free as possible and can be spring-biased in relation to the guide element, which reliably prevents the rattling and clattering noises that would otherwise occur at this point during steering operation. The preload is advantageously selected such that it is greater than the torque-related support forces originating from the roadway during "normal" driving. In this context, the term "normal" means, for example, driving over common road bumps, gravel roads or cobblestones—not increased support torques, such as those that occur when driving over potholes, parking when stationary, etc. The accompanying sliding friction due to the spring preload also has a damping effect against unwanted chassis resonances such as so-called wheel wobble. The necessary magnitude of the spring preload force can therefore also be selected under consideration of this requirement.

In an example embodiment, the first spring element is supported on the bearing block on the one hand and on the first sliding element on the other.

In an example embodiment, the first spring element and the second spring element are formed in one piece, in particular monolithically. In other words, the sliding elements are then spring-loaded by a common spring element, for example a spiral spring. The spring element then bears against the first sliding element on the one hand and the second sliding element on the other.

A spring element, as used in connection with the present disclosure, is a mechanical component that stores and releases energy in the form of an elastic deformation. It is designed in such a way that it undergoes a certain deformation when a force is applied and returns to its original shape when this force is removed. A spring element can be selected from the group of spiral springs, leaf springs, disc springs, torsion springs and/or rubber springs.

According to an example embodiment, the first spring element and/or the second spring element can be designed as a spiral spring. In an example embodiment, the spiral spring consists of an elastic material such metal which is wound into a spiral or helical shape. A spiral spring can be selected from the group of tension springs, compression springs, torsion springs, conical and non-cylindrical springs.

According to an example embodiment, the first sliding element can have a coupling section against which the first spring element bears. This coupling section can be designed in such a way that it absorbs the forces transmitted by the spring element to the sliding element and introduces them into the sliding element and then distributes them, without causing mechanical damage to the sliding element. In this regard, the spring element can bear directly against the coupling section of the sliding element. It would also be conceivable to arrange a washer between the coupling section and the spring element, which can provide for an improved pressure distribution in the sliding element, as well as a more abrasion-resistant contact surface, which can contribute to increased operational reliability and reduced susceptibility to wear of the steering gear.

In this context, the coupling section can have a cylindrical receptacle in which the first spring element, which is designed as a spiral spring, engages. This can result in improved guidance of the spring element relative to the spiral spring, which helps to prevent unintentional loosening or slipping of the spiral spring relative to the sliding element.

According to an example embodiment, the bearing block can have a first receiving region for the first sliding element, wherein the first receiving region has a spherically or cylindrically formed contact section against which a corresponding contact section of the first sliding element bears in such a way that the first sliding element can be pivoted about an angle with respect to the first receiving region. This allows the sliding guide of the bearing block to be designed in such a way that it is able to compensate for the deflections and angular errors that occur during operation of the steering shaft, thus ensuring a consistent quality of the sliding contact.

A contact section of the bearing block can be concave and a contact section of a sliding element can be convex, which leads to a particularly favorable introduction of force during the axial displacement of the bearing block, as a sliding element edge can bear against the bearing block for support. In principle, however, it would also be conceivable to swap the convex/concave arrangement.

Furthermore, it is advantageous if the spherically formed contact section is adjoined by a cylinder section extending into the interior of the bearing block, in which a corresponding contact section of the first sliding element engages, which can contribute to an improved mounting of the sliding element on the bearing block.

In one possible embodiment, the first sliding element and/or the second sliding element can be designed to be essentially cylindrical. In this regard, the contact surface has an essentially round, or circular surface shape. The cylindrical sliding element can have different cylindrical sections with different diameters along its longitudinal extension.

In principle, it would also be conceivable for the first sliding element and/or the second sliding element to be designed to be essentially cuboid. In this case, the contact surface then has an essentially rectangular surface shape.

In order to enable a good connection of a spring element in particular, the first sliding element and the second sliding element can have a different spatial form from one another. In principle, it would also be conceivable, for example in order to increase the degree of part uniformity in the steering gear, to design the sliding elements to be identical.

According to an example embodiment, the bearing block can be made of a metallic material by means of machining or metal casting. In principle, it is also conceivable to mold the bearing block from a plastic, for example by means of injection molding.

According to an example embodiment, the bearing block is formed from a metal sheet and the bearing block formed from a metal sheet has a first metal sheet section and a second metal sheet section extending essentially parallel to the first metal sheet section, wherein the first metal sheet section carries the first sliding element and the second metal sheet section carries the second sliding element. A bearing block made from sheet metal using a forming process can, in particular, provide cost advantages with respect to the manufacture of the steering gear. It is also possible to realize weight advantages within the steering gear by using a bearing block formed from sheet metal.

In an example embodiment, the first metal sheet section and the second metal sheet section can be designed such that they exert a spring force acting in the direction of the first sliding surface and/or in the direction of the second sliding surface on the first sliding element and/or on the second sliding element. By integrating a spring element into the design of the bearing block, it is possible to dispense with an additional spring element in the steering gear, which can result in corresponding weight and cost advantages. In principle, it is of course also conceivable that a separate spring element is used in addition to the spring effect of the bearing block made of sheet metal, which may then be designed to be smaller in size, however.

In an example embodiment, a first spring cup is arranged between the first sliding element and the first spring element, which transmits the spring force of the first spring element to the first sliding element. This offers the advantage that the force of the spring element is not introduced directly into the sliding element, which can contribute to a more uniform pressure distribution. Furthermore, the spring cup can also provide for an improved guidance of the spring element, in particular a spiral spring, by having a cup-like projection extending into the spiral spring. The spring cup can be made of a metallic material such as sheet metal.

According to an example embodiment, the first sliding surface can be formed such that it exerts a spring force in the direction of the first sliding element. It would also be conceivable in principle that the second sliding surface is formed such that it exerts a spring force in the direction of the second sliding element. This means that one or both sliding surfaces can exert a spring force on the respective sliding element. In this way, for example, a spring element within the movable bearing block can be dispensed with and the spring effect can be shifted to a static region of the steering gear.

In order to apply the spring force, a spring element can be coupled to a sliding surface, wherein the sliding surface itself then does not need to exhibit any spring elasticity.

However, a metal sheet can be inserted between the guide element and a sliding element for improved friction behavior. This is particularly advantageous if the guide element is formed from an aluminum material and has correspondingly high coefficients of friction. Since a sliding element is then in sliding contact with the metal sheet as a sliding surface, correspondingly lower coefficients of friction can be realized between the sliding partners.

In this context, in an example embodiment, at least one of the intermediate plates serving as a sliding surface is designed to be resilient. For this purpose, the metal sheet can be bent, curved or angled, for example, in order to provide a resilient element.

According to one embodiment, the first sliding surface can be formed by a first metal sheet and/or the second sliding surface can be formed by a second metal sheet. casein an example embodiment, at least one of the metal sheets exhibits a spring effect.

However, it would also be possible for the first metal sheet and the second metal sheet to be formed in one piece, in particular monolithically.

According to an example embodiment, a first stop element is arranged on the bearing block which, when a predefined displacement position is reached in a first displacement direction of the bearing block, abuts against a second stop element which is stationary relative to the steering shaft. This allows for a mechanical end stop for the steering movement to be integrated into the steering gear.

In this context, a third stop element can be arranged on the bearing block which, when a predefined displacement position is reached in a second displacement direction of the bearing block, abuts against a fourth stop element which is stationary relative to the steering shaft.

In order to reduce manufacturing and assembly costs, the first stop element and the second stop element can be formed in one piece, in particular, also monolithically.

BRIEF DESCRIPTION OF THE DRAWINGS

The disclosure is explained in more detail below with reference to figures without limiting the general concept of the disclosure.

In the drawings.

DETAILED DESCRIPTION

Figure 1:
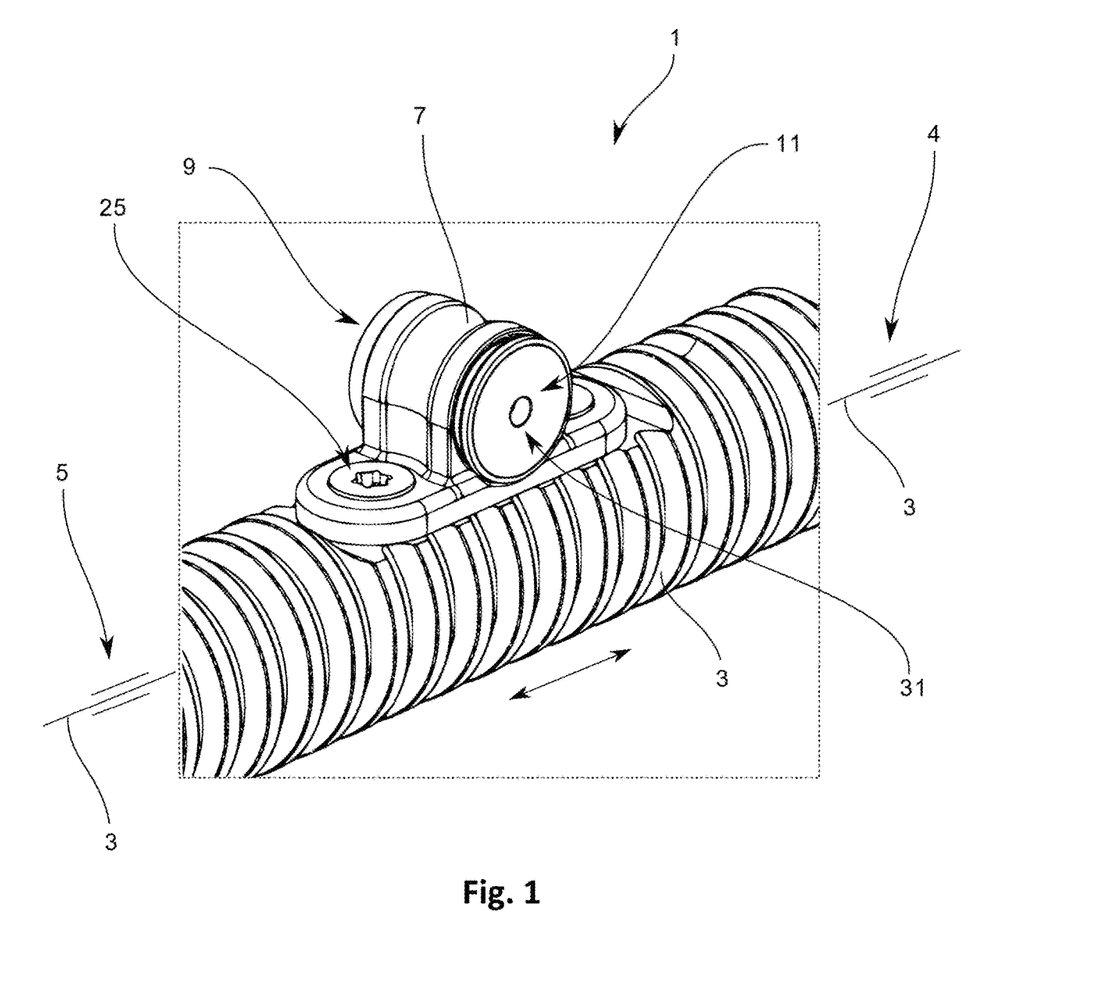
FIG. 1 shows a first embodiment of a steering gear in a perspective view.

FIG. 1 shows a first embodiment of a steering gear 1 for a motor vehicle, comprising a steering shaft 3 that is arranged in a non-rotatable manner and linearly displaceable and is mounted on a first bearing point 4 and a second bearing point 5 spaced apart in the longitudinal extension of the steering shaft 3. The steering shaft 3 is in engagement with a rotatable gear element in such a way that a rotation of the gear element affects a linear displacement of the steering shaft 3. The gear element can be a gear worm or a spindle nut, for example.

Figure 2:
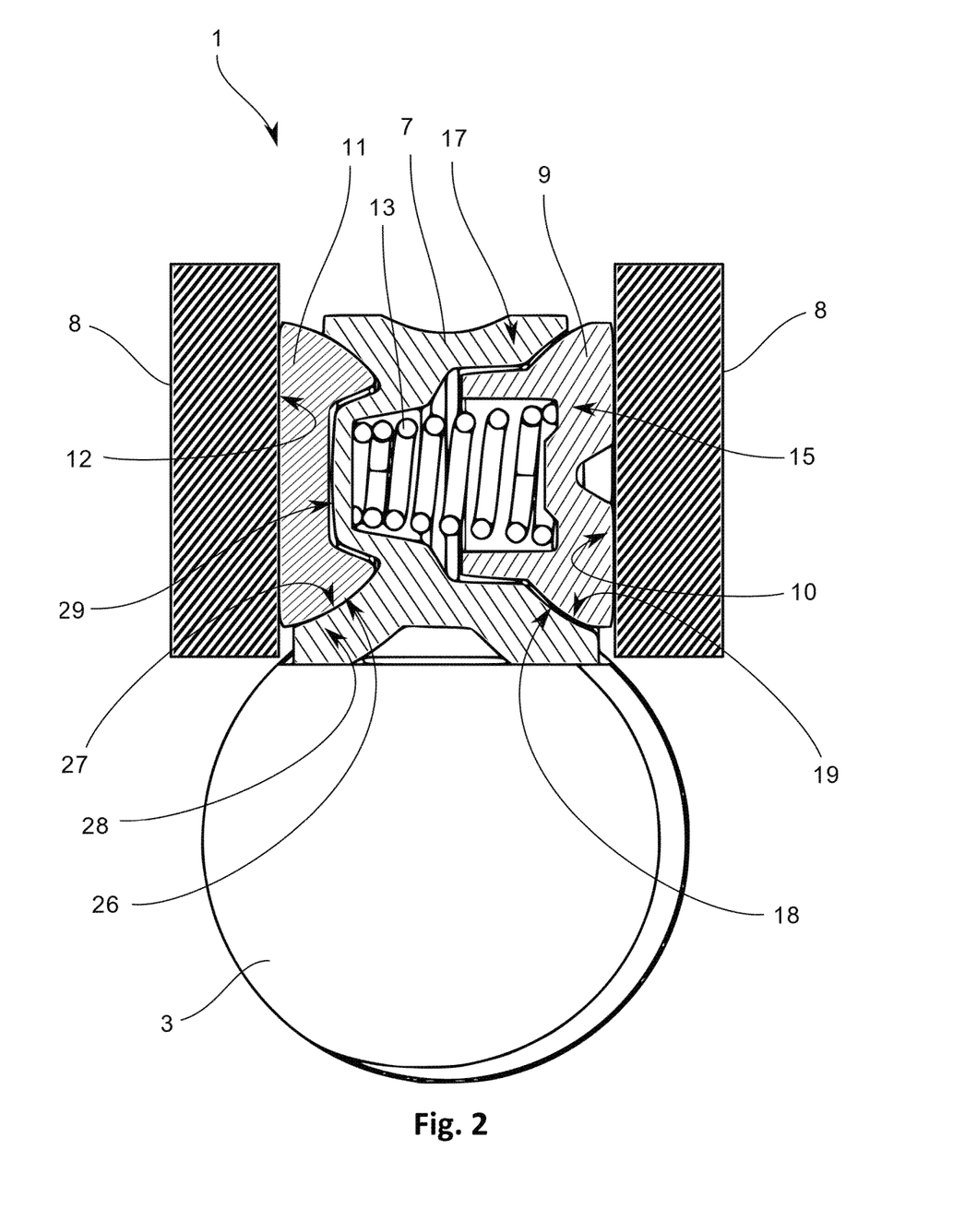
FIG. 2 shows a first embodiment of a steering gear in a cross-sectional view.

A bearing block 7 is fixed to the steering shaft 3 between the first bearing point 4 and the second bearing point 5 by means of a screw connection 25, which extends radially outwards from the lateral surface of the steering shaft 3 and engages in a guide element 8 that is stationary relative to the steering shaft 3, which can be clearly seen in FIG. 2.

Between the bearing block 7 and the guide element 8, a first sliding element 9 bears against a first sliding surface 10 of the guide element 8 and a second sliding element 11 bears against a second sliding surface 12 of the guide element 8 opposite the first sliding surface 10. The sliding elements 9, 11 have a circular contact surface 31.

FIG. 2 further shows that the first sliding element 9 is spring-loaded in the direction of the first sliding surface 10 by means of a first spring element 13 designed as a spiral spring. The first spring element 13 is supported in a pre-loaded manner on the bearing block 7 on the one hand and on the first sliding element 9 on the other. The second sliding element 11, on the other hand, is mounted on a protruding dome 29 of the bearing block 7 without direct spring force action, in that the dome 29 engages in a corresponding recess of the second sliding element 11. However, the second sliding element 11 is indirectly preloaded by the spring element 13 being supported on the bearing block 7, which in turn then presses against the second sliding element 11.

The first sliding element 9 has a coupling section 15 against which the first spring element 13 bears. As can also be clearly seen in FIG. 3, the coupling section 15 has a cylindrical receptacle 16 in which the first spring element 13, which is designed as a spiral spring, engages.

Figure 3:
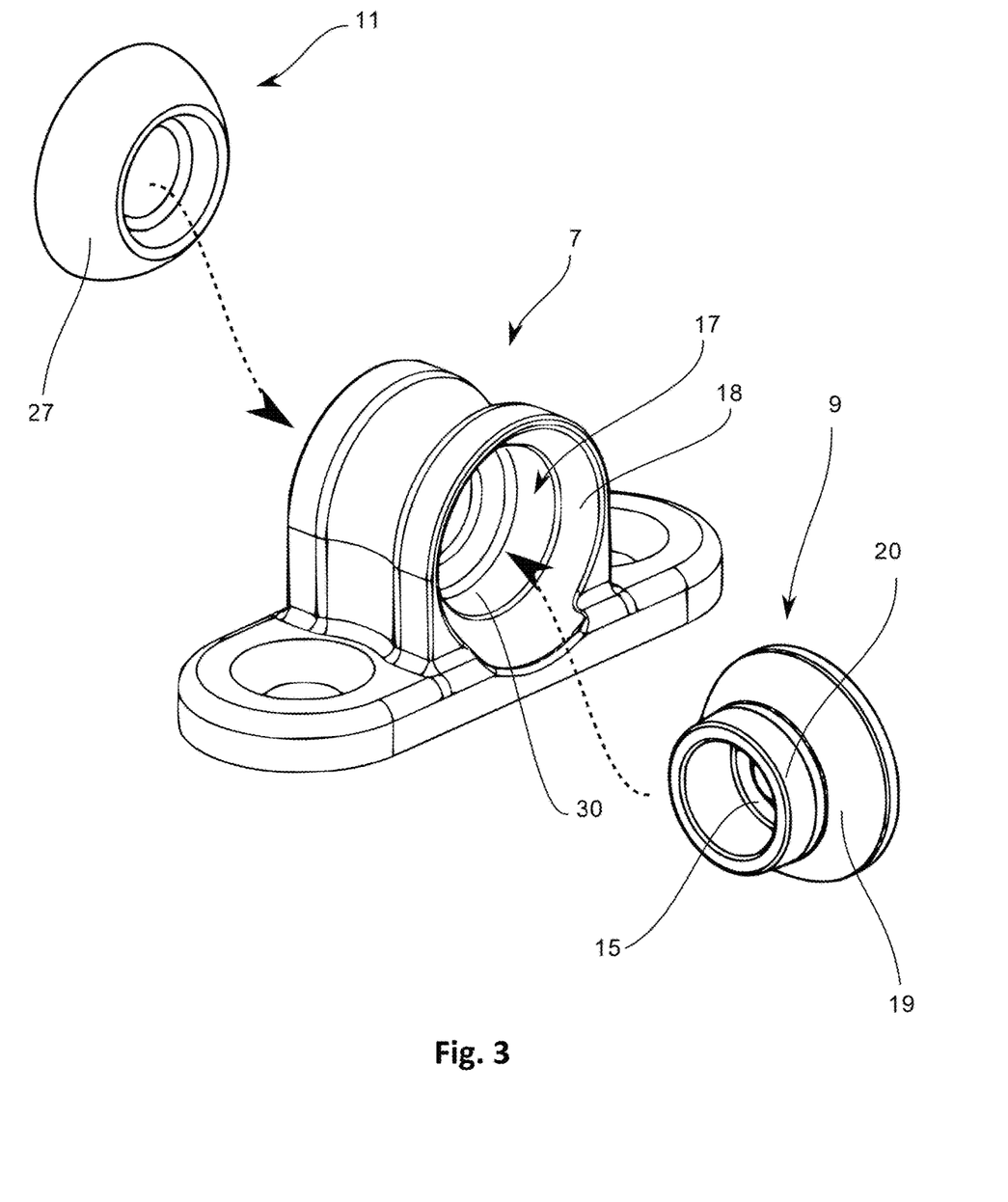
FIG. 3 shows a bearing block and two sliding elements of the first embodiment of the steering gear in an exploded view.

The bearing block 7 further has a first receiving region 17 for the first sliding element 9, wherein the first receiving region 17 has a spherically formed contact section 18 against which a corresponding contact section 19 of the first sliding element 9 bears in such a way that the first sliding element 9 can be pivoted about an angle with respect to the first receiving region 17. The bearing block 7 also has a corresponding second receiving region 28 for the second sliding element 11. This second receiving region 28 also has a spherically formed contact section 26, against which the correspondingly formed contact section 27 of the second sliding element 11 bears in such a way that the second sliding element 11 can also compensate for angular misalignments.

The spherically formed contact section 18 is adjoined by a cylinder section 30 extending into the interior of the bearing block 7, in which a corresponding contact section 20 of the first sliding element 9 engages.

In the embodiment shown in FIGS. 1-3, the first sliding element 9 and the second sliding element 11 are designed to be essentially cylindrical, wherein the first sliding element 9 and the second sliding element 11 have a different spatial form from one another.

Figure 4:
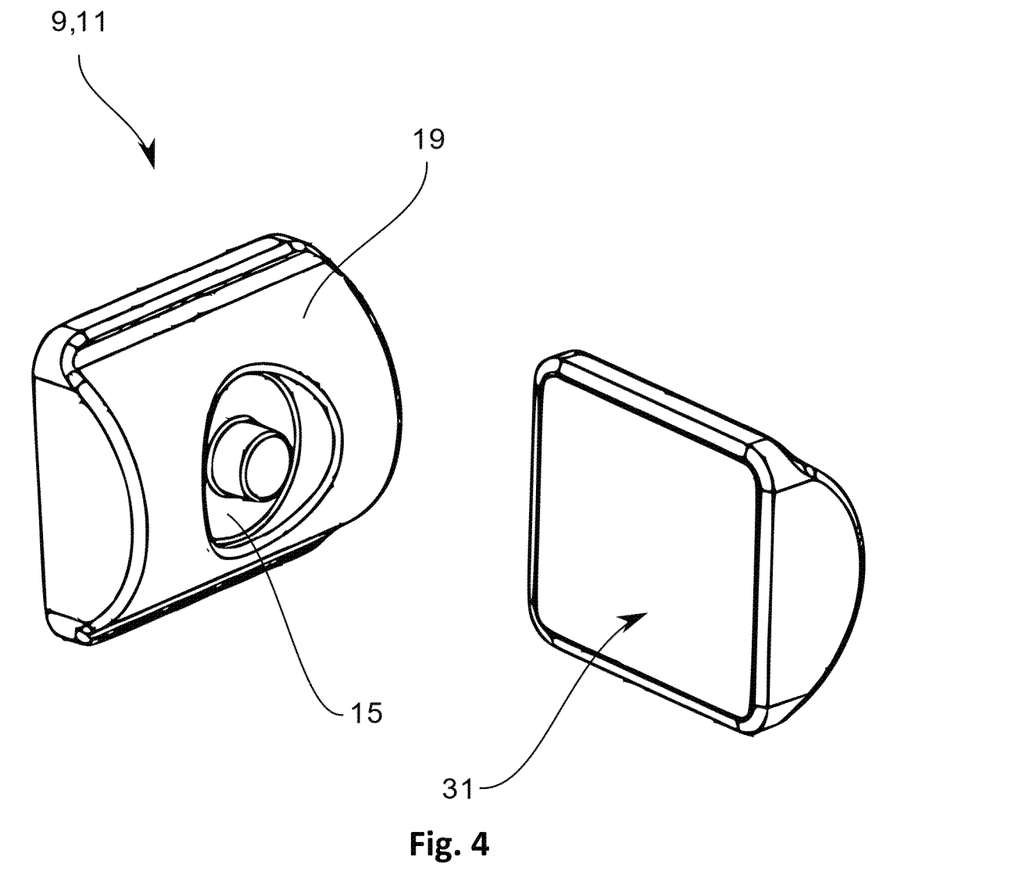
FIG. 4 shows a cuboid embodiment of a sliding element in two perspective views.

However, as shown in FIG. 4, it is also conceivable in principle to design a sliding element 9, 11 to be essentially cuboid and essentially identical. A sliding element 9, 11 formed in this manner then also does not have a spherical but a cylindrical contact section 19, which is accommodated in a corresponding cylindrical contact section 18 of the receiving region 17 of the bearing block 7. While spherical contact sections 18, 19 allow for angular compensation in practically all spatial directions, a cylindrical contact section 18, 19 only allows for angular compensation around one pivot axis.

FIGS. 5-9 show further embodiments of the steering gear 1 in which the bearing block 7 is formed from a metal sheet 22. The bearing block 7 formed from a metal sheet 22 has a first metal sheet section 23 and a second metal sheet section 24 extending essentially parallel to the first metal sheet section 23, wherein the first metal sheet section 23 carries the first sliding element 9 and the second metal sheet section 24 carries the second sliding element 11, which can be easily seen in FIG. 6.

Figure 6:
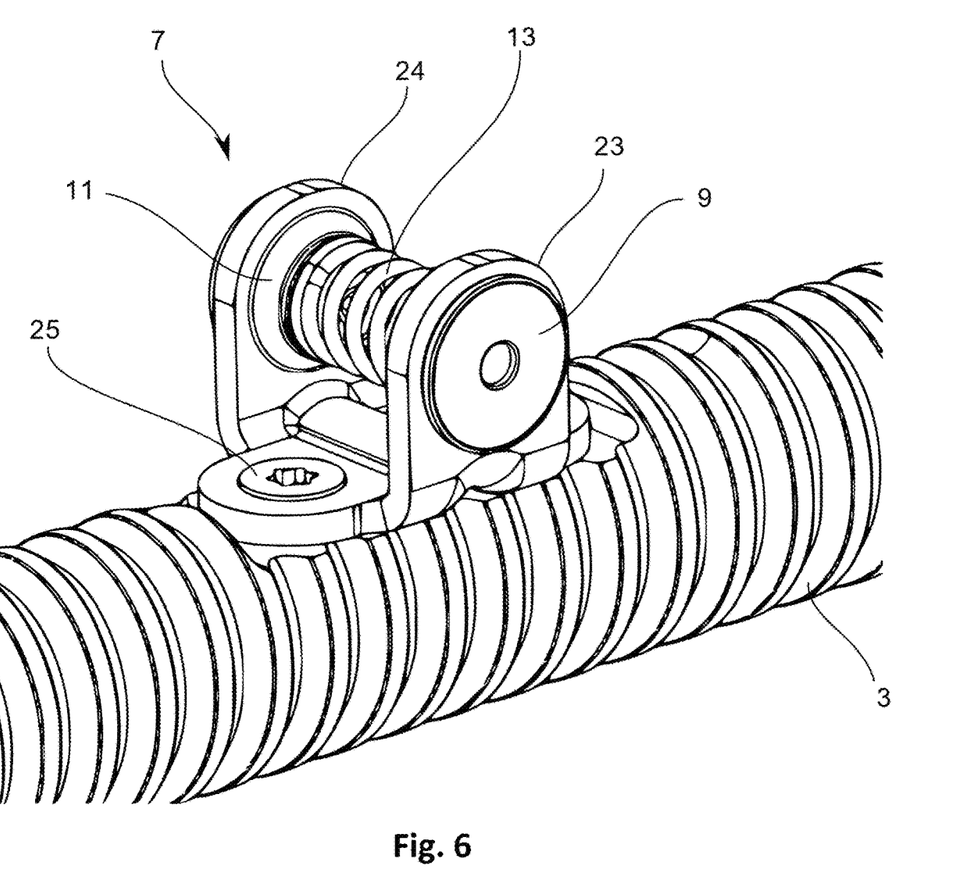
FIG. 6 shows a second embodiment of a steering gear in a guide element in a perspective view.

In this case, the first metal sheet section 23 and the second metal sheet section 24 can be designed such that they exert a spring force acting in the direction of the first sliding surface 10 and/or in the direction of the second sliding surface 12 on the first sliding element 9 and/or on the second sliding element 11.

Figure 5:
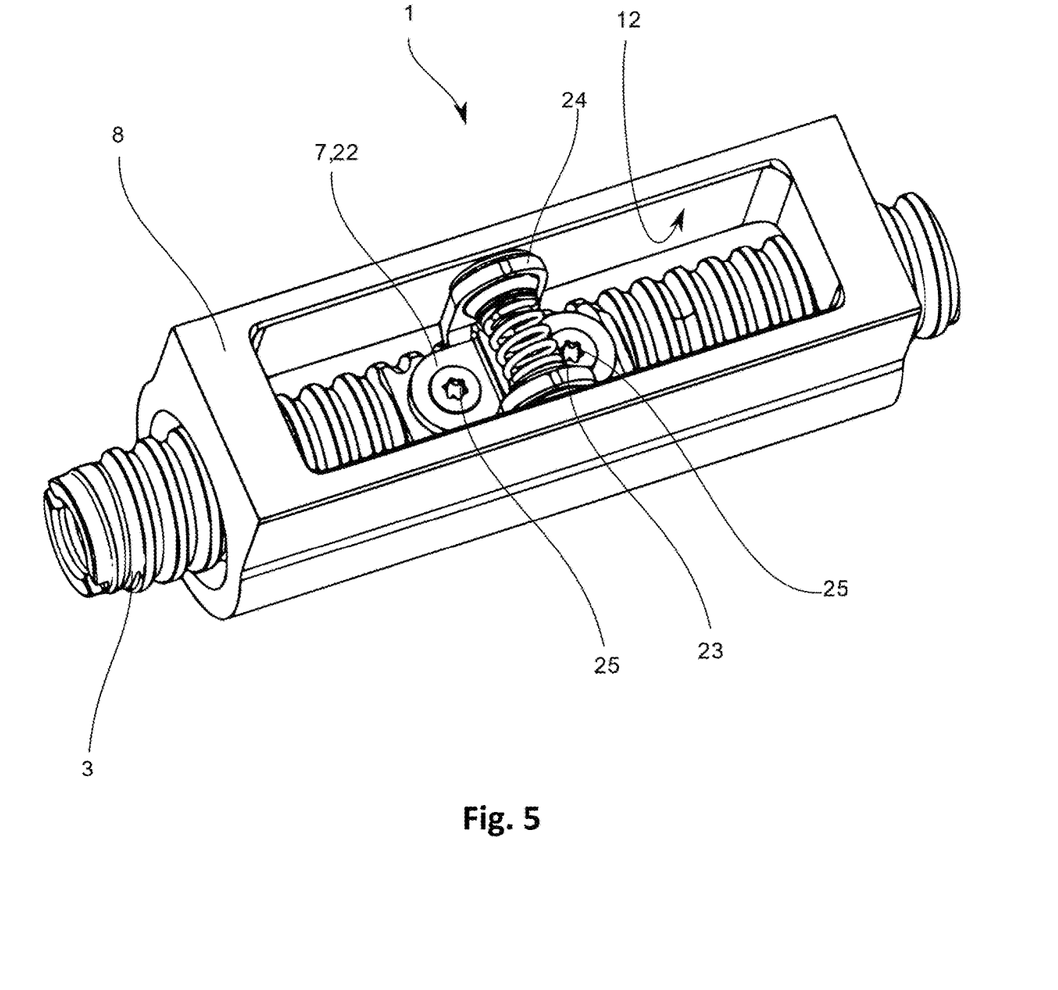
FIG. 5 shows a second embodiment of a steering gear in a guide element in a perspective view.

FIG. 5 shows the guide element 8, which in the exemplary embodiment shown is designed as a housing component of the steering gear 1. The steering shaft 3 extends through the guide element 8, which has sliding surfaces 10, 12 extending parallel to this longitudinal extension of the steering shaft 3. In this design variant, it is conceivable that the bearing block 7, together with the length of the housing guide shown, also serves as a mechanical steering end stop, and the bearing block 7 can strike against the end-face stop surfaces of the guide element 8.

In this regard, at least one stop element (not shown) made of a plastic, in particular an elastomer, can additionally be provided, which is connected to the bearing block 7, for example by placing the stop element over the bearing block 7. It would also be possible for a first stop element to be arranged on the bearing block 7 which, when a predefined displacement position is reached in a first displacement direction of the bearing block 7, abuts against a second stop element which is stationary relative to the steering shaft 3 and for a third stop element to be arranged on the bearing block 7 which, when a predefined displacement position is reached in a second displacement direction of the bearing block 7, abuts against a fourth stop element which is stationary relative to the steering shaft 3. The first stop element and the second stop element can be formed in one piece, in particular also monolithically.

Figure 7:
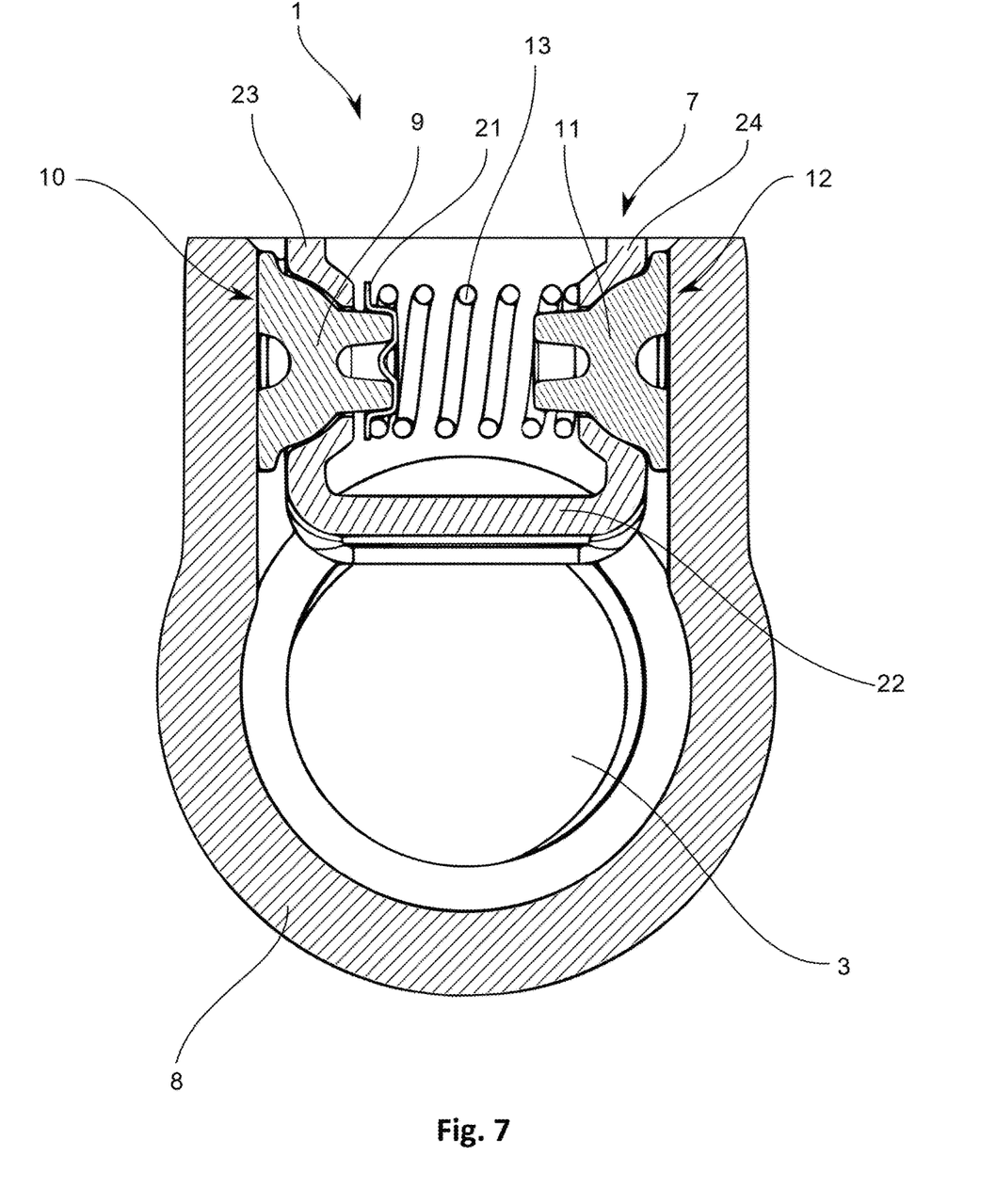
FIG. 7 shows a second embodiment of a steering gear in a guide element in a cross-sectional view.

FIG. 7 shows that a first spring cup 21 is arranged between the first sliding element 9 and the first spring element 13 and transmits the spring force of the first spring element 13 to the first sliding element 9. In this regard, the spring cup 21 engages in the spiral-shaped first spring element 13, which contributes to an improved guidance of the spring element 13 relative to the spring cup 21. The first spring element 13 then bears against a circumferential, radially outwardly extending collar of the spring cup 21.

Figure 8:
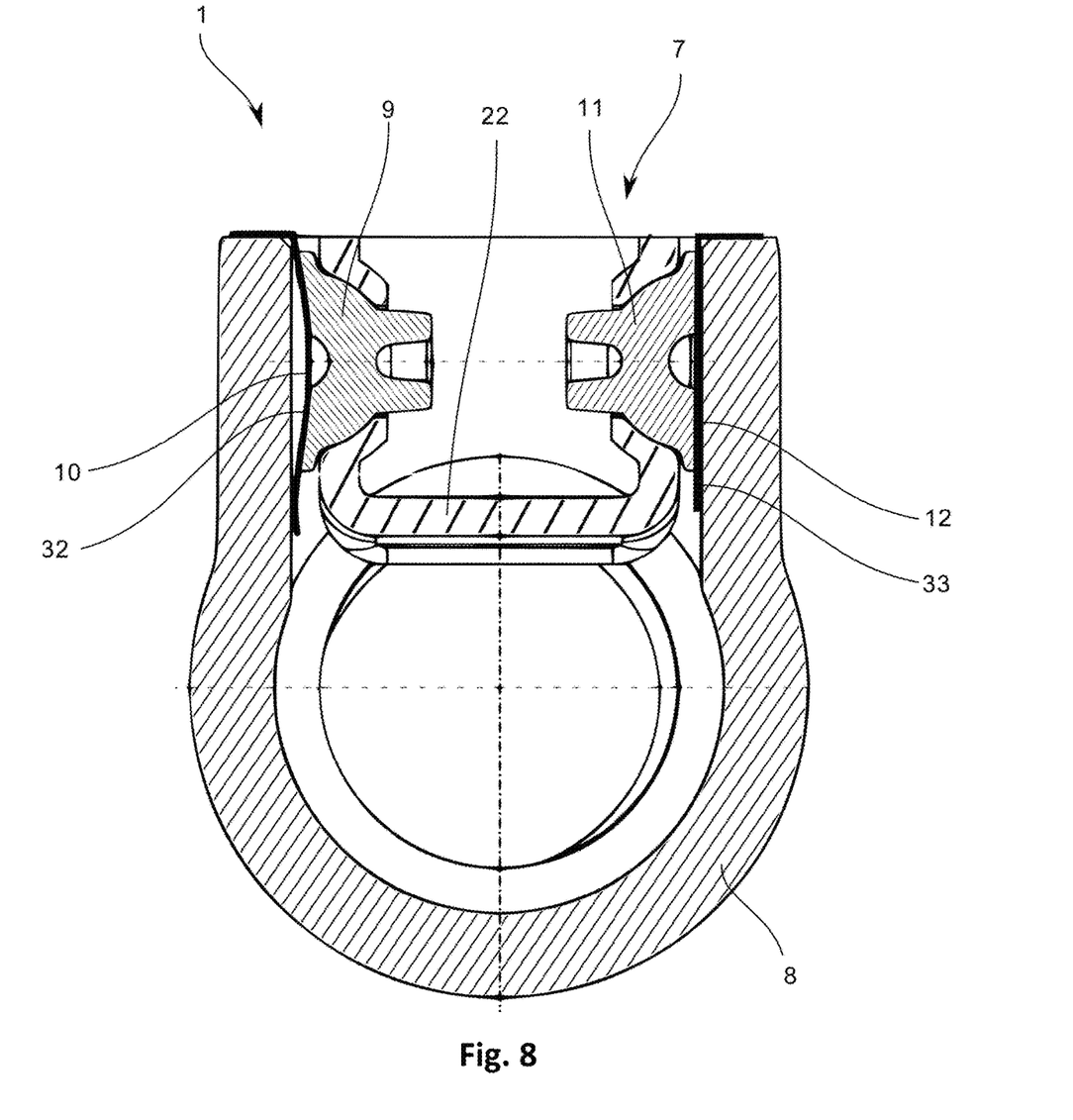
FIG. 8 shows a third embodiment of a steering gear in a guide element in a cross-sectional view.
Figure 9:
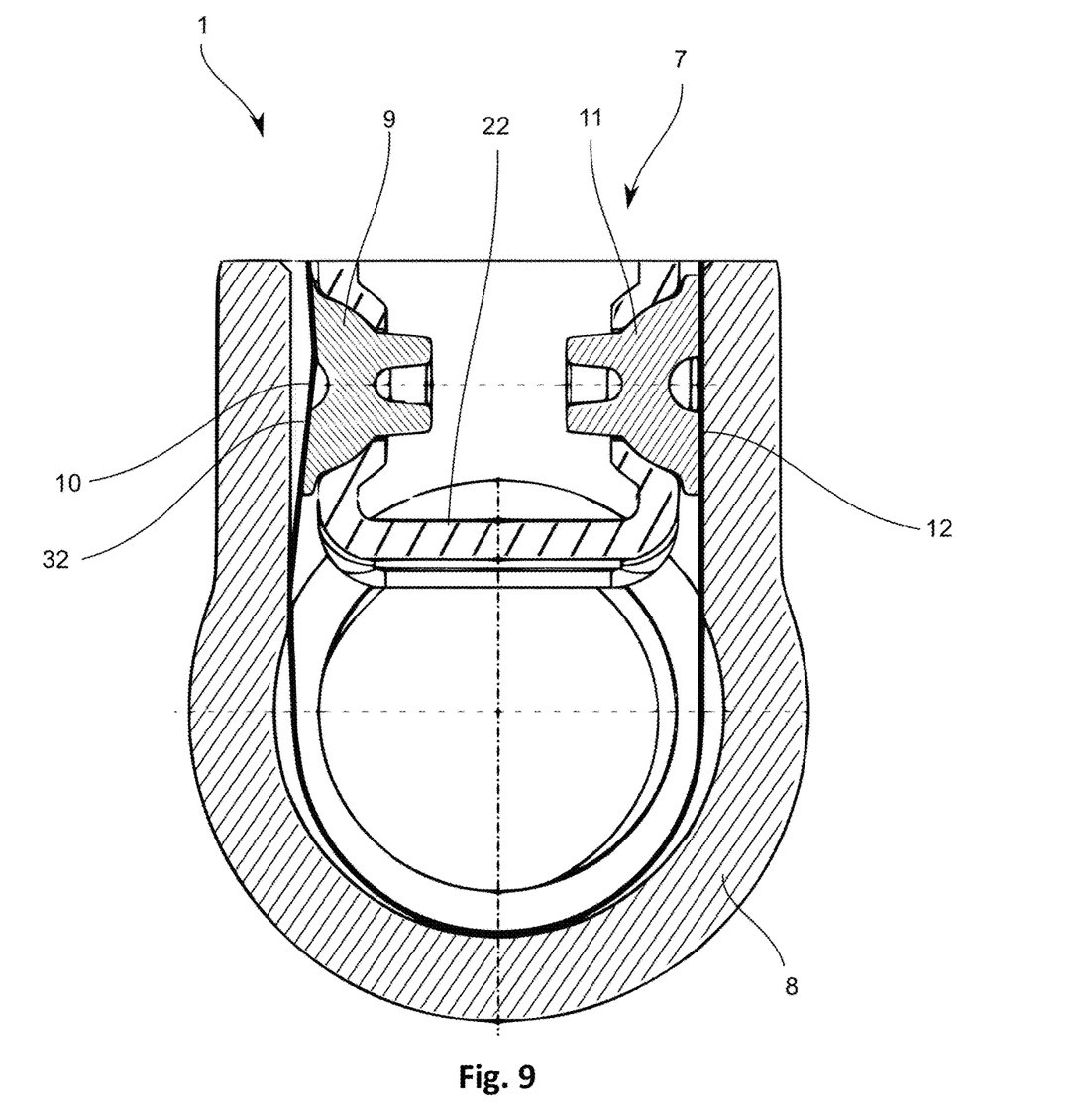
FIG. 9 shows a fourth embodiment of a steering gear in a guide element in a cross-sectional view.

FIGS. 8-9 show embodiments of the steering gear 1 in which the first sliding surface 10 is formed such that it exerts a spring force in the direction of the first sliding element 9. For this purpose, the first sliding surface 10 is formed on a first metal sheet 32, which is arranged between the guide element 8 and the first sliding element 9. The first metal sheet 32 has a convex curvature pointing in the direction of the first sliding element 9, which affects the spring force of the first sliding surface 10. A second metal sheet 33 is also arranged on the opposite side in order to ensure that the sliding surfaces 10, 12 and the sliding elements 9, 11 have as identical a sliding friction as possible on both sides. The second metal sheet 33 has no curvature and therefore no spring effect either.

As can be seen in FIG. 9, the resilient effect of the first sliding surface 10 can also be affected by a metal sheet 32 that is bent in a U-shape and has a curvature in the region of the first sliding surface 10. In this case, the one free leg of the U-shaped metal sheet 32 then serves as the first sliding surface 10 and the other free leg as the second sliding surface 12.

The disclosure is not limited to the embodiments shown in the figures. The above description is therefore not to be regarded as limiting, but rather as illustrative. The following claims are to be understood as meaning that a stated feature is present in at least one embodiment of the disclosure. This does not exclude the presence of further features. Where the claims and the above description define 'first' and 'second' features, this designation serves to distinguish between two features of the same type without defining an order of precedence.

LIST OF REFERENCE SYMBOLS

1 Steering gear
3 Steering shaft
4 Bearing point
5 Bearing point
7 Bearing block
8 Guide element
9 Sliding element
10 Sliding surface
11 Sliding element
12 Sliding surface
13 Spring element
15 Coupling section
16 Receptacle
17 Receiving region
18 Contact section
19 Contact section
20 Contact section
21 Spring cup
22 Metal sheet
23 Metal sheet section
24 Metal sheet section
25 Screw connection
26 Contact section
27 Contact section
28 Receiving region
29 Dome
30 Cylinder section
31 Contact surface
32 Metal sheet
33 Metal sheet

The invention claimed is:

1. A steering gear for a motor vehicle, comprising:
a steering shaft that is non-rotatably arranged and linearly displaceable is mounted on a first bearing point and a second bearing point spaced apart from the first bearing point in a longitudinal direction of the steering shaft,
a bearing block fixed to the steering shaft between the first bearing point and the second bearing point, the bearing block extending radially outwardly from a lateral surface of the steering shaft and engaging in a guide element that is stationary relative to the steering shaft, and
a first sliding element arranged between the bearing block and the guide element, the first sliding element bearing against a first sliding surface of the guide element, and
a second sliding element bearing against a second sliding surface of the guide element opposite the first sliding surface.

2. The steering gear according to claim 1, wherein the bearing block has a first receiving region for receiving the first sliding element, and the first receiving region has a spherically or cylindrically formed contact section against which a corresponding contact section of the first sliding element bears such that the first sliding element pivots with respect to the first receiving region.

3. The steering gear according to claim 1, wherein the first sliding element is spring-loaded in a direction of the first sliding surface, and the second sliding element is spring-loaded in a direction of the second sliding surface.

4. The steering gear according to claim 3, wherein the first sliding element has a coupling section against which a spring element bears.

5. The steering gear according to claim 3, wherein the first sliding element and the second sliding element are spring loaded via a spiral spring.

6. The steering gear according to claim 5, wherein the first sliding element and the second sliding element are spring loaded via a same spiral spring.

7. The steering gear according to claim 6, wherein a first spring cup is arranged between the first sliding element and a spring element that transmits a spring force to the first sliding element.

8. The steering gear according to claim 1, wherein the bearing block is formed from a metal sheet and the bearing block has a first metal sheet section and a second metal sheet section extending essentially parallel to the first metal sheet section, and the first metal sheet section supports the first sliding element and the second metal sheet section supports the second sliding element.

9. The steering gear according to claim 8, wherein the first metal sheet section and the second metal sheet section are configured to exert a spring force on the first sliding element and/or the second sliding element, the spring force acting in a direction of the first sliding surface and/or in a direction of the second sliding surface.

10. The steering gear according to claim 1, wherein the first sliding surface exerts a spring force in a direction of the first sliding element.

11. A steering gear for a motor vehicle, comprising:
a steering shaft that is non-rotatably arranged and linearly displaceable is mounted on a first bearing point and a second bearing point spaced apart from the first bearing point in a longitudinal direction of the steering shaft,
a bearing block fixed to the steering shaft between the first bearing point and the second bearing point, the bearing block extending radially outwardly from a lateral surface of the steering shaft and engaging in a guide element that is stationary relative to the steering shaft,
a first sliding element arranged between the bearing block and the guide element, the first sliding element springably pre-loaded and slidably engaging a first sliding surface of the guide element,
a second sliding element arranged between the bearing block and the guide element, the second sliding element springably preloaded and slidably engaging a second sliding surface of the guide element, the second sliding surface arranged opposite the first sliding surface, and
the bearing block includes:
a first curved contact section that slidably receives a curved contact section of the first sliding element so that the first sliding element pivots about at least one axis to compensate for angular misalignment between the first sliding surface and the first sliding element,
a second curved contact section that slidably receives a curved contact section of the second sliding element so that the second sliding element pivots about at least one pivot axis to compensate for angular misalignment between the second sliding surface and the second sliding element.

12. The steering gear according to claim 11, wherein at least one of the first curved contact section or the curved contact section of the first sliding element is concave, and a remaining one of the at least one of the first curved contact section or the curved contact section of the first sliding element is convex.

13. The steering gear according to claim 11, wherein at least one of the first sliding element or the second sliding element pivots about a plurality of pivot axes to compensate for angular misalignment.

14. The steering gear according to claim 11, wherein the first curved contact section and the curved contact section of the first sliding element are spherical.

15. The steering gear according to claim 11, wherein the first curved contact section and the curved contact section of the first sliding element are cylindrical.

16. The steering gear according to claim 11, further comprising a spring element, and
a first end of the spring element bears against the first sliding element, and
a second end of the spring element bears against the bearing block.

17. The steering gear according to claim 16, further comprising a spring cup arranged between the first sliding element and the first end of the spring element.

18. A steering gear for a motor vehicle, comprising:
a steering shaft that is non-rotatably arranged and linearly displaceable is mounted on a first bearing point and a second bearing point spaced apart from the first bearing point in a longitudinal direction of the steering shaft,
a bearing block fixed to the steering shaft between the first bearing point and the second bearing point, the bearing block extending radially outwardly from a lateral surface of the steering shaft and engaging in a guide element that is stationary relative to the steering shaft,
a first sliding element arranged between the bearing block and the guide element, the first sliding element springably pre-loaded via a spring element, the spring element arranged between the first sliding element and a first sliding surface of the guide element such that the first sliding element slidably engages the spring element, and
a second sliding element springably preloaded between the bearing block and the guide element, the second sliding element guided via a second sliding surface of the guide element.

19. The steering gear according to claim 18, wherein the bearing block is constructed from one piece of sheet metal using a forming process.

* * * * *